(12) United States Patent
Barmeier

(10) Patent No.: US 10,371,013 B2
(45) Date of Patent: Aug. 6, 2019

(54) THERMAL ENERGY STORAGE PLANT

(71) Applicant: Siemens Aktiengesellschaft, München (DE)

(72) Inventor: Till Andreas Barmeier, Hamburg (DE)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

(21) Appl. No.: 15/556,417

(22) PCT Filed: Mar. 20, 2015

(86) PCT No.: PCT/EP2015/055918
§ 371 (c)(1),
(2) Date: Sep. 7, 2017

(87) PCT Pub. No.: WO2016/150461
PCT Pub. Date: Sep. 29, 2016

(65) Prior Publication Data
US 2018/0106165 A1 Apr. 19, 2018

(51) Int. Cl.
F01K 3/12 (2006.01)
F28F 27/00 (2006.01)
(Continued)

(52) U.S. Cl.
CPC .......... *F01K 3/12* (2013.01); *F01K 3/18* (2013.01); *F01K 5/00* (2013.01); *F28D 17/005* (2013.01);
(Continued)

(58) Field of Classification Search
CPC ..... F01K 3/12; F01K 3/18; F01K 5/00; F28D 17/04; F28D 17/005; F28D 20/0056;
(Continued)

(56) References Cited

U.S. PATENT DOCUMENTS 4,215,553 A * 8/1980 Poirier ............... F02C 1/05
165/104.34
4,283,914 A * 8/1981 Allen ................. F03G 6/06
60/641.14
(Continued)

FOREIGN PATENT DOCUMENTS

CN 102834591 A 12/2012
EP 2698505 A1 2/2014
(Continued)

OTHER PUBLICATIONS

International Search Report for PCT Application No. PCT/EP2015/055918, dated Nov. 23, 2015.
(Continued)

*Primary Examiner* — Hoang M Nguyen
(74) *Attorney, Agent, or Firm* — Schmeiser, Olsen & Watts, LLP

(57) ABSTRACT

Provided is a thermal energy storage plant including a charging circuit where a first working fluid is circulated, the charging circuit includes a first fluid transporting machine for generating a flow of the first working fluid in charging circuit, a heating device electrically powered for transferring heat to the first working fluid, a heat accumulator for storing the thermal energy of the first working fluid, the heat accumulator including a hot end for receiving the first working fluid at a first temperature and a cold end for letting the first working fluid exit the heat accumulator at a second temperature lower than the first temperature, the heat accumulator includes a plurality of heat storage units connected in series between the hot end and the cold end, which may be separated by valves.

10 Claims, 6 Drawing Sheets

(51) Int. Cl.
| | |
|---|---|
| *F28D 17/04* | (2006.01) |
| *F28D 20/00* | (2006.01) |
| *F28D 17/00* | (2006.01) |
| *F28D 17/02* | (2006.01) |
| *F01K 5/00* | (2006.01) |
| *F01K 3/18* | (2006.01) |

(52) U.S. Cl.
CPC .............. *F28D 17/02* (2013.01); *F28D 17/04* (2013.01); *F28D 20/0056* (2013.01); *F28F 27/00* (2013.01); *F28F 27/006* (2013.01); *F28D 2020/006* (2013.01); *Y02E 60/142* (2013.01)

(58) Field of Classification Search
CPC .. F28D 17/02; F28D 2020/006; F28F 27/006; F28F 27/00; Y02E 60/142
USPC ........................................................... 60/659
See application file for complete search history.

(56) References Cited

U.S. PATENT DOCUMENTS

| | | | |
|---|---|---|---|
| 5,269,145 A | 12/1993 | Krause et al. | |
| 7,971,437 B2* | 7/2011 | Flynn .................... | F01K 3/12 29/592 |
| 8,621,868 B2* | 1/2014 | Shinnar .................... | F03G 6/04 60/659 |
| 2011/0100611 A1* | 5/2011 | Ohler ....................... | F01K 3/00 165/104.28 |
| 2011/0162829 A1 | 7/2011 | Xiang | |
| 2012/0312496 A1* | 12/2012 | Howes ..................... | F01K 3/12 165/7 |
| 2014/0008033 A1* | 1/2014 | Howes ................ | F28D 20/0056 165/10 |
| 2014/0299122 A1* | 10/2014 | Muren ................... | F28D 20/02 126/714 |
| 2015/0040564 A1 | 2/2015 | Capan | |

FOREIGN PATENT DOCUMENTS

| | | |
|---|---|---|
| WO | 2013160650 A2 | 10/2013 |
| WO | 2014032827 A1 | 3/2014 |

OTHER PUBLICATIONS

Extended European Search Report dated Sep. 5, 2018 for Application No. 15741756.9.
Non-English Chinese Office Action for application No. 201580078037.9 dated Nov. 29, 2018.
EP Office Action for application No. 15 741 756.9 dated Mar. 12, 2019.

\* cited by examiner

THERMAL ENERGY STORAGE PLANT

CROSS-REFERENCE TO RELATED APPLICATIONS

This application claims priority to PCT Application No. PCT/EP2015/055918, having a filing date of Mar. 20, 2015, the entire contents of which are hereby incorporated by reference.

FIELD OF TECHNOLOGY

The following relates to a plant for storing thermal energy and to a method for operating such plant.

BACKGROUND

The integration of renewable energy into the main power supply network challenges the grid, since it was designed for central power production. Electricity generated by renewable energy sources has an unlimited precedence for power supply to the electricity network. Energy production from renewable energy sources is difficult to forecast and depends on weather conditions such as wind speed or solar radiation. To handle this fluctuating production, renewable energy sources need to be curtailed, fossil fueled power plants providing base load need to become more flexible or the excess energy has to be sold cheaply abroad. In addition, the location of production of renewable energy such as onshore and offshore wind does not coincide with the region of high power consumption. Therefore, energy storages play an important role in the improvement of the stability of power supply networks.

Sensible thermal storages are state of the art for storing fluctuating energy from renewable sources. Electrical excess energy from the main supply grid is transformed into thermal energy and is stored in some storage material. In times with no or low occurrence of wind, the stored thermal energy is used for generating steam to produce electrical energy over a steam turbo generator and the produced electricity is fed in the main supply grid.

A possible solution to this problem is provided by a thermal energy storage plant, which is a combination of a charge cycle and a discharge cycle, that are both connected to a heat storage unit. The charge cycle comprises, in a closed loop, a fluid transporting machine, e.g. a fan, a heating device, which may be a resistant or inductive heater, or a heat pump fed by the electrical power generated by a renewable energy source or from the electricity grid, and the heat storage unit. The discharge cycle comprises, in a closed loop, the same heat storage unit of the charge cycle, a blower and a water steam cycle. The water steam cycle includes a thermal machine such as a steam turbine and a heat recovery steam generator (HRSG), a boiler, a heat exchanger or an evaporator, for transferring the thermal energy to water to generate steam which is fed to the thermal machine to produce electrical power from an electrical generator connected to the thermal machine.

The heat storage unit is typically filled with solid or bulk materials, for example stones, bricks, ceramics and other solid materials, which have the ability to be heated up and to keep their temperature over a long period of time in order to store the thermal energy which has been transferred to them. Alternatively a phase change material can be used in the heat storage unit.

These materials are heated using a working fluid, e.g. air, circulating in the charge cycle, which has a temperature higher than the storage material. In the discharge cycle the stored energy is recovered through a flow of the same or different fluid, which has a lower temperature than the storage material. Therefore, the heat storage unit has a respective hot and a cold end.

In the charge cycle, the heat storage unit is connected by a pipe or ducting system to the heating device and to the fluid transporting machine. The fluid transporting machine moves the working fluid through the heating device to the hot end of the thermal storage. A temperature front travels through the heat storage unit from the hot end to the cold end. The temperature front is a zone of strong temperature gradient in the heat storage unit, which separates the hot and the cold zone in the heat storage unit. The charging of the heat storage unit stops, when the temperature at the cold end begins to rise above a chosen temperature threshold.

In the discharge cycle the mass flow of the working fluid will be guided through the heat storage unit in the opposite direction compared to the charge cycle. In the discharge cycle the working fluid enters the heat storage unit at the cold end, reaches the assigned temperature inside the heat storage unit and leaves at the hot end before the working fluid enters the steam generator.

The temperature front travels in reverse direction compared to the charging cycle through the heat storage unit. When the temperature at the hot end begins to decrease the discharging process is stopped.

In the thermal energy storage plants described above, natural convection plays an important role when the heat storage unit is installed horizontally. This is caused by different densities of the working fluid having different temperatures at the hot and cold ends of the heat storage unit. This effect causes a non-homogenous temperature distribution over the length of the storage.

The air at the cold end of the storage has a higher density than the air at the hot end. When the storage plant is in idle mode, between charging and discharging operations, this causes, by natural convection, an air circulation inside the heat storage unit which makes the temperature front tilt: hot air from the upper part of the hot end of the heat storage unit moves towards the upper part of the cold end while cold air from the lower part of the cold end of the heat storage unit moves towards the lower part of the hot end. The longer the storage remains in idle mode, the higher is the air circulation caused by natural convection. This leads to a reduced mixed temperature in the storage, which causes an exergy loss and strongly reduces the usable energy in the water steam cycle and consequently the round trip overall efficiency of the storage plant.

A possible solution may be to use vertical heat storage units, where natural convection plays no considerable role. The temperature front in vertical heat storages is in fact perpendicular to the direction of gravity. Therefore, the temperature front moves vertically through the storage and the temperature front remains unaffected by natural convection during charging, idle or discharging. However, the assembly and installation of vertical heat storage units determines a number of inconveniences, e.g. it causes high cost because of its foundation requirements, inlet and outlet connections are more complex and heights available for the installation may be limited.

Therefore, it may be a need for improving a thermal energy storage plant in such a manner that the above mentioned inconveniences can be suppressed or reduced in an optimized way.

SUMMARY

This need may be met by the subject matter according to the independent claims. Advantageous embodiments of the present invention are described by the dependent claims.

According to a first aspect of embodiments of the invention, there is provided a thermal energy storage plant comprising a charging circuit where a first working fluid is circulated, the charging circuit including:
- a first fluid transporting machine for generating a flow of the first working fluid in the charging circuit,
- a heating device electrically powered for transferring heat to the first working fluid,
- a heat accumulator for storing the thermal energy of the first working fluid, the heat accumulator including a hot end for receiving the first working fluid at a first temperature and a cold end for letting the first working fluid exit the heat accumulator at a second temperature lower than the first temperature, wherein the heat accumulator comprises a plurality of heat storage units connected in series between the hot end and the cold end.

The first fluid transporting machine guides the transport fluid through every heat storage unit, from the first heat storage unit, close to the hot end, to the last heat storage unit, close to the cold end. The first fluid transporting machine, the heating device and heat accumulator may be arranged in a closed loop, so that the first working fluid, after exiting the last heat storage unit, passes through the heating device and enters the first heat storage unit again. Advantageously, this provides that the heat storage units which are upstream the last heat storage unit can be completely charged to the desired first temperature. This causes a homogenous temperature distribution inside the heat storage units, when they are fully charged, which prevents natural convection phenomena. After the charging of the upstream heat storage units is completed by the first working fluid flowing from the hot end to the cold end, only the last heat storage unit contains the temperature gradient between the first to the second temperature, thus the effect of natural convection is limited to this last heat storage unit.

According to a possible embodiment of the present invention, the heat accumulator further includes at least one valve interposed between two heat storage units of said plurality of heat storage units.

Thanks to the valves interposed between the heat storage units, during idling operations, i.e. between charging and discharging phases, the heat storage units can be disconnected from each other to prevent a mass flow between them initiated by natural convection. In particular mass flow generates in that heat storage unit, which contains the temperature gradient. Therefore, according to an advantageous embodiment of the present invention, a valve is provided for isolating the last heat storage unit from the heat storage unit immediately upstream.

According to another possible embodiment of the present invention, the thermal energy storage plant further comprises a discharging circuit including:
- the heat accumulator included also in the charging circuit,
- a second fluid transporting machine for generating a flow of the second working fluid in the discharging circuit, the flow being oriented from the cold end to the hot end of the heat accumulator,
- a thermal cycle for transforming the thermal energy from the second working fluid into mechanical power.

Particularly, the thermal cycle may be a water-steam cycle including a thermal machine and a steam generator for transferring thermal energy from the second working fluid to a mass of water in order to generate steam to be fed to the thermal machine.

The use of the heat accumulator according to the present invention provides an efficient way of reducing the losses when using the thermal energy stored in the heat accumulator for generating electrical energy power in the thermal machine, which may consist, for example, in a steam turbo generator. In particular, this allows to more efficiently managing the electrical power generated from a renewable energy source.

According to another possible embodiment of the present invention, the first and the second working fluid of, respectively, the charging and discharging circuits, are the same.

Advantageously, this allows a common flow path inside the heat accumulator to be used during charging and discharging.

According to another possible embodiment of the present invention, the heat accumulator is oriented in such a way that the first working fluid is circulated from the hot end to the cold end along a horizontal direction. The horizontal mounting of the heat accumulator causes the temperature gradient described above to form. With such an installation, the use of the heat accumulator according to embodiments the present invention provides an efficient way of reducing the losses caused by natural convection.

According to a further aspect of embodiments of the invention there is provided a method for operating the thermal energy storage plant described above. The method comprising the steps of:
- heating the first working fluid,
- generating a flow of the first working fluid in the charging circuit, for charging the heat storage units in series from the hot end to the cold end,
- stopping the heating and the flow of the first working fluid after at least one heat storage unit has been fully charged. In this case one heat storage units contains the temperature gradient. The heat storage unit that contains the gradient may be the last, i.e. the one which is closest to the cold end. Alternatively, intermediate charging states may be possible, e.g. when wind conditions do not allow for full charging of the storage. In that case, it is not the last heat storage unit, which contains the temperature gradient but, for example one of the intermediate.

The criterion for stopping the charging process is either that the temperature gradient has moved into the last storage unit or that the outside conditions (e.g. wind or electricity prices) are no longer beneficial for charging the storage.

According to a possible embodiment of the present invention, the method further comprises the step of isolating the charged heat storage units from the other heat storage units, by means of the valves provided between the heat storage units.

According to a possible embodiment of the present invention, the method further comprises the step of isolating the heat storage units from the other heat storage units, by means of the valves provided between the heat storage units. This allows, for example, in the embodiment of the attached figures, the first two heat storage units, which have a constant temperature profile, to be let in communication with one another, but isolated from the last heat storage unit.

According to another possible embodiment of the present invention, the method comprises the steps of:

generating a flow of the second working fluid in the discharging circuit, from the cold end to the hot end, for transferring heat from the heat storage units to the second working fluid, stopping the heating and the flow of the second working fluid after the temperature at an inlet of a first heat storage unit which is closest to the hot end has started to decline, i.e. has reached a temperature lower than the first temperature.

The method according to embodiments of the present invention permit to reach the same advantages described above with reference to the plant apparatus according to embodiments of the present invention It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this document.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
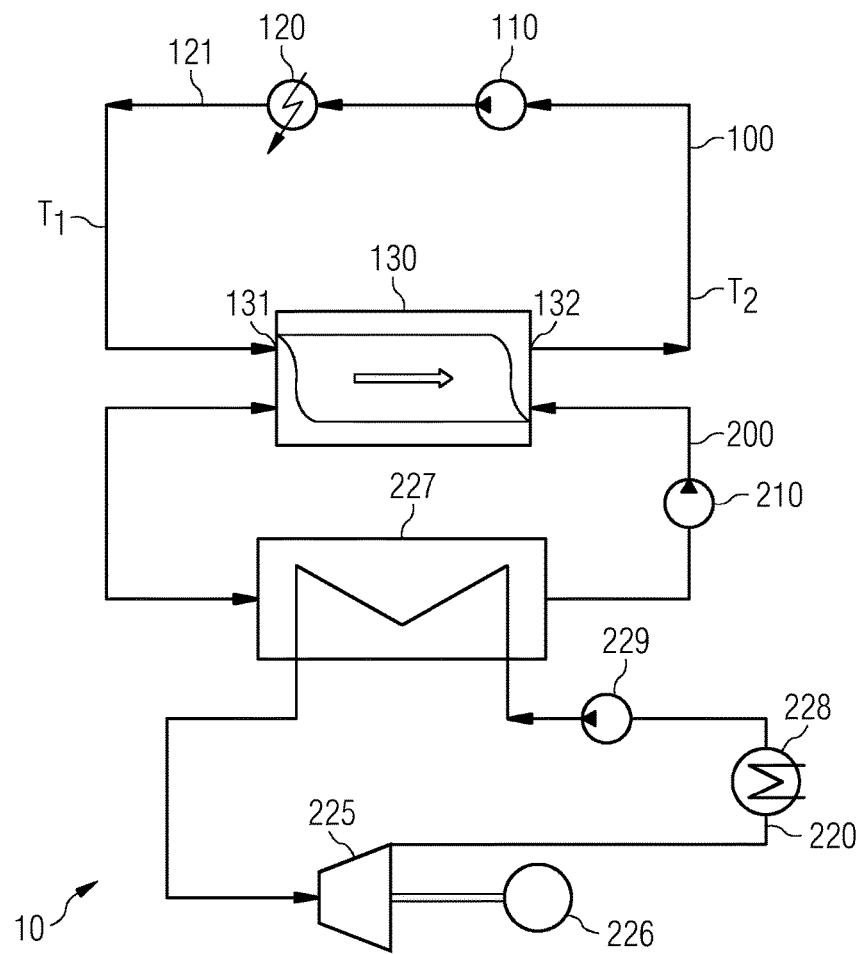
FIG. 1 shows a schematic diagram of a thermal energy storage plant, in accordance with embodiments of the present invention.

The illustration in the drawing is schematically. It is noted that in different figures, similar or identical elements or features are provided with the same reference signs. In order to avoid unnecessary repetitions elements or features which have already been elucidated with respect to a previously described embodiment are not elucidated again at a later position of the description.

Figure 2:
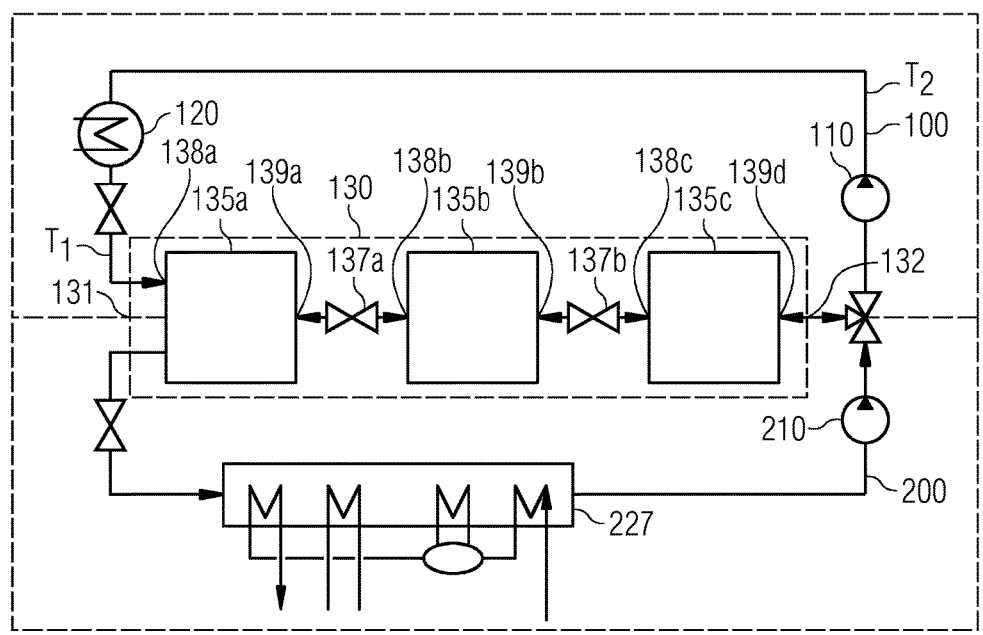
FIG. 2 shows a partial schematic view of the diagram of FIG. 1, showing with more details some components of the thermal energy storage plant, in accordance with embodiments of the present invention.

FIGS. 1 and 2 schematically show a thermal energy storage plant 10 comprising a charging circuit 100 and a discharging circuit 200, where, respectively, a first working fluid and a second working fluid are circulated.

The first and the second working fluid may be in particular the same, for example being both constituted by hot air.

According to other possible embodiments, the first and second working fluids may be different gaseous or liquid or steam media.

The charging circuit 100 includes, in a closed loop:
a first fluid transporting machine 110 for generating a flow of the first working fluid in the charging circuit 100,
a heating device 120 electrically powered for transferring heat to the first working fluid,
a heat accumulator 130 for storing the thermal energy of the first working fluid, the heat accumulator 130 including a hot end 131 for receiving the first working fluid at a first high temperature $T1$ and a cold end 132 for letting the first working fluid exit the heat accumulator 130 at a second low temperature $T2$ lower than the first high temperature $T1$.

In the attached figures, the first fluid transporting machine 110 is immediately downstream the cold end 132 of the heat accumulator 130. According to another possible embodiment of the present invention (not shown), the first fluid transporting machine 110 is immediately upstream the hot end 131 of the heat accumulator 130.

When the first working fluid is air, the first fluid transporting machine 110 may be constituted by a fan or blower.

The heating device 120 may be a resistant or inductive heater or a heat pump fed by the electrical power generated by a renewable energy source, for example the wind speed generating power by means of a wind turbine or solar radiation generating power by means of photovoltaic cells, or from the electricity grid.

The heating device 120 permits the first hot temperature $T1$ and the second low temperature $T2$ to be established between the hot end 131 and cold end 132 of the heat accumulator 130. According to possible embodiments of the present invention, typical values are $T1=600°$ C. and $T2=120°$ C. In other possible embodiments, values of $T2$ may be close to ambient temperature or $300°$ C.

In general, other values are possible, the value of hot temperature $T1$ depends on the operating temperature of a thermal cycle 220 comprised in the discharging circuit 200 for transforming the thermal energy from the second working fluid into mechanical power, as detailed in the following. The low temperature $T2$ is typically kept higher than ambient temperature in order to reduce the heat load required in the heating device 120 for raising the first working fluid temperature up to the high temperature $T1$.

According to possible embodiments of the present invention, the heat accumulator 130 is oriented in such a way that the first working fluid is circulated from the hot end 131 to the cold end 132 along a horizontal direction. In such type of installations, the temperature front which forms between the hot end 131 and the cold 132 of the heat accumulator 130 travels horizontally, from the hot end 131 to the cold end 132. The temperature front so oriented typically tends to tilt, in particular during idle periods, for the effect of natural convection.

The discharging circuit 200 includes, in closed loop:
the heat accumulator 130, a heat exchanger 227 included in a thermal cycle 220 for transforming the thermal energy from the second working fluid into mechanical power, a second fluid transporting machine 210 for generating a flow of the second working fluid in the discharging circuit 200, oriented from the cold end 132 to the hot end 131 of the heat accumulator 130. The working fluid of the discharging circuit 200 flows therefore in opposite direction with respect to the flow of the working fluid in the charging circuit 100.

According to a possible embodiment of the present invention, the thermal cycle 220 is a cycle including a thermal machine 225 and wherein the heat exchanger 227 is a steam generator for transferring thermal energy from the second working fluid to a mass of water in order to generate steam to be fed to the thermal machine 225. The thermal machine 225 may be a steam turbine having an output shaft connected to an electrical generator 226 to produce electricity to be fed in a electricity grid. According to another possible embodiment, the thermal cycle 220 may include, instead of the steam generator 227, a boiler or an evaporator or other type of heat exchanger for transferring heat from the second working fluid to the thermal cycle 220.

The thermal cycle 220 further includes a condenser 228, connected to the outlet of the steam turbine 225 and a pump 229, between the condenser 228 and steam generator 227. Other types of thermal cycles may be used instead of the described thermal cycle 220, provided that, in general, they are able to transform the thermal energy from the discharging circuit 200 into mechanical power for powering the electrical generator 226.

With reference to FIGS. 2 to 5, the heat accumulator 130 comprises a plurality of heat storage units (three heat storage units 135a, 135b, 135c in the non-limiting embodiment of the attached figures) connected in series between the hot end 131 and the cold end 132. With reference to FIG. 6, each heat storage unit 135a, 135b, 135c comprises respectively a housing 150a, 150b, 150c extending from an inlet 138a, 138b, 138c to an outlet 139a, 139b, 139c. Each housing 150a, 150b, 150c contains a plurality of heat storing elements 160 having high thermal capacity, for example solid or bulk materials like stones, bricks, ceramics and other solid materials, which have the ability to be heated up and to keep their temperature over a long period of time in order to store the thermal energy which has been transferred to them. Each heat storage unit 135a, 135b, 135c is configured for working with the same working fluid to be used for the charging circuit 100 and for the discharging circuit. When the charging circuit 100 is operated, the working fluid, for example air, flows from the inlet 138a, 138b, 138c to the outlet 139a, 139b, 139c, transferring heat to storing elements 160. When the discharging circuit 200 is operated, the same working fluid flows from the outlet 139a, 139b, 139c to the inlet 138a, 138b, 138c, receiving heat from the storing elements 160.

According to other possible embodiments of the present invention, other types of heat storage unit may be used, in particular being configured for the use with two working fluids, one for the charging circuit 100, the other for the discharging circuit 200. This may be achieved, for example, providing the each heat storage unit 135a, 135b, 135c with a first inlet and a first outlet for the first working fluid and with a second inlet and a second outlet for the second working fluid.

The heat accumulator 130 further includes one or more valves (two valves 137a, 137b, in the non-limiting embodiment of the attached figures) interposed between respective couples of consecutive heat storage units 135a, 135b, 135c. In the embodiment of the attached figures, a first valve 137a is placed on a pipe connecting the outlet 139a, 139b, 139c of the first (i.e. closest to the hot end 131) heat storage unit 135a with the inlet 138a, 138b, 138c of the intermediate heat storage unit 135b while a second valve 137b is placed on a pipe connecting the outlet 139a, 139b, 139c of the intermediate heat storage unit 135b with the inlet 138a, 138b, 138c of the last (i.e. closest to the cold end 132) heat storage unit 135c.

Figure 3:
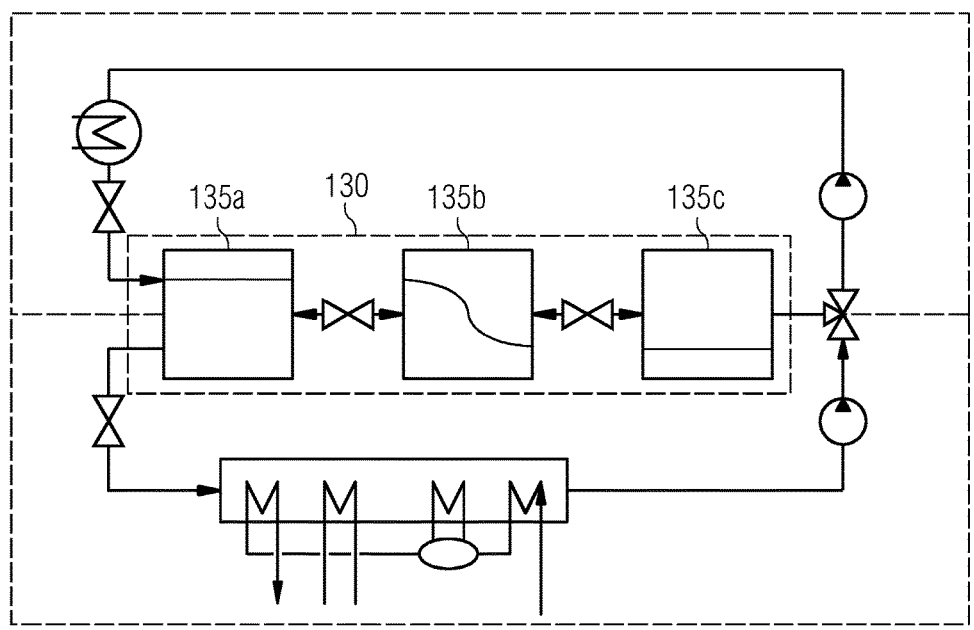
FIG. 3 shows a version of FIG. 2, in a first operative condition, in accordance with embodiments of the present invention.
Figure 4:
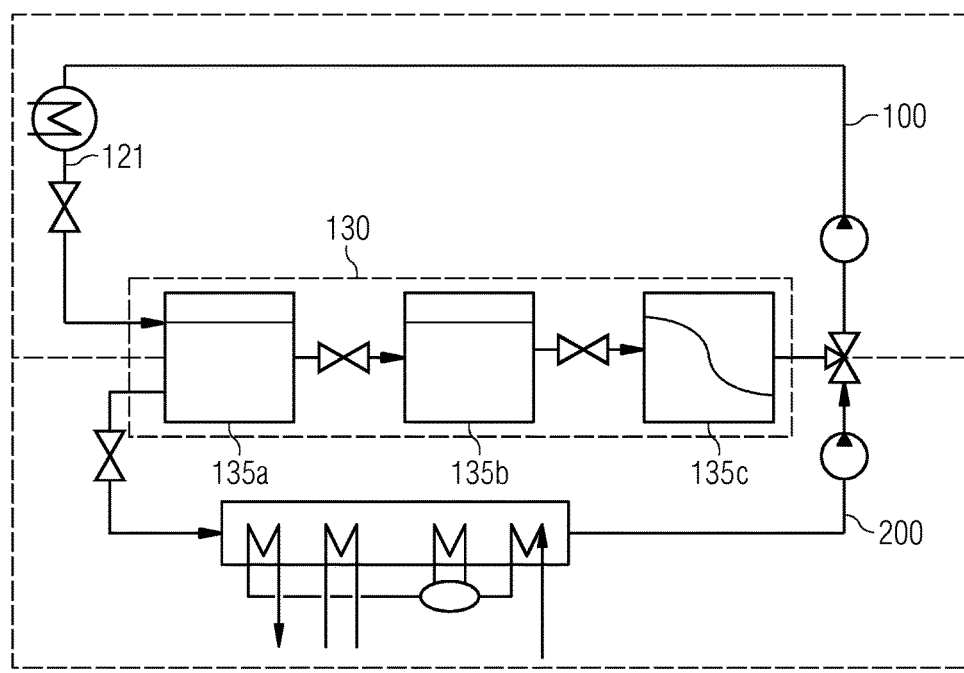
FIG. 4 shows a version of FIG. 2, in a second operative condition, in accordance with embodiments of the present invention.

According to the present invention, a method for operating the thermal energy storage plant 10, during charging of the heat accumulator 130, comprises the steps of:

heating the first working fluid by means of the heating device 120 of the charging cycle 100, using the first fluid transporting machine 110 for generating a flow of the first working fluid in the charging circuit 100, for charging the heat storage units 135a, 135b, 135c of the heat accumulator 130, in series from the hot end 131 to the cold end 132. During charging, a temperature front moves from the first heat storage unit 135a to the last heat storage unit 135c (an intermediate operative condition with the temperature front in the intermediate heat storage unit 135b is shown in FIG. 3), stopping the heating and the flow of the first working fluid after the last heat storage unit 135c has been charged, i.e. when the temperature front reaches the outlet 139c of the last heat storage unit 135c (FIG. 4) and the temperature T2 at the cold end 132 rises, isolating the heat storage units 135a, 135b 135c from each other by means of the valves 137a, 137b.

After the charging of the heat accumulator 130 has been completed, in the first and intermediate heat storage units 135a, 135b the temperature profile is constant from the respective inlet 138a, 138b to the respective outlet 139a, 139b. This will prevent the occurrence of natural convection in the first and intermediate heat storage units 135a, 135b. This condition can be maintained easily by closing the valves 137a, 137b between the heat storage units 135a, 135b, 135c, in particular the second valve 137b between the intermediate and last heat storage units 135b, 135c. In such a way, natural convection which may occur in the last heat storage unit 135c will not influence the other heat storage units 135a, 135b.

The same result can be obtained, according to other embodiments of the present invention, using a different number of heat storage units, for example two or more than three heat storage units. The same result cannot be obtained with only one heat storage unit, because in this case it will not be possible to isolate the portion of the heat accumulator 130 having a constant temperature profile from the portion of the heat accumulator 130 containing the temperature front.

According to a possible alternative embodiment, only the second valve 137b is closed for isolating only the last heat storage unit 135c, i.e. the heat storage unit which includes the temperature front after the charging has been completed. With reference to the embodiment of the attached figures, this leaves the first and intermediate heat storage units 135a, 135b, which have a constant temperature profile, in communication with one another, but isolated from the last heat storage unit 135c.

According to possible alternative embodiments, intermediate charging states may be possible, e.g. when wind conditions do not allow for full charging of the storage. In that case, it is not the last heat storage unit 135c, which contains the temperature gradient but, for example, the intermediate heat storage unit 135*b*.

Figure 5:
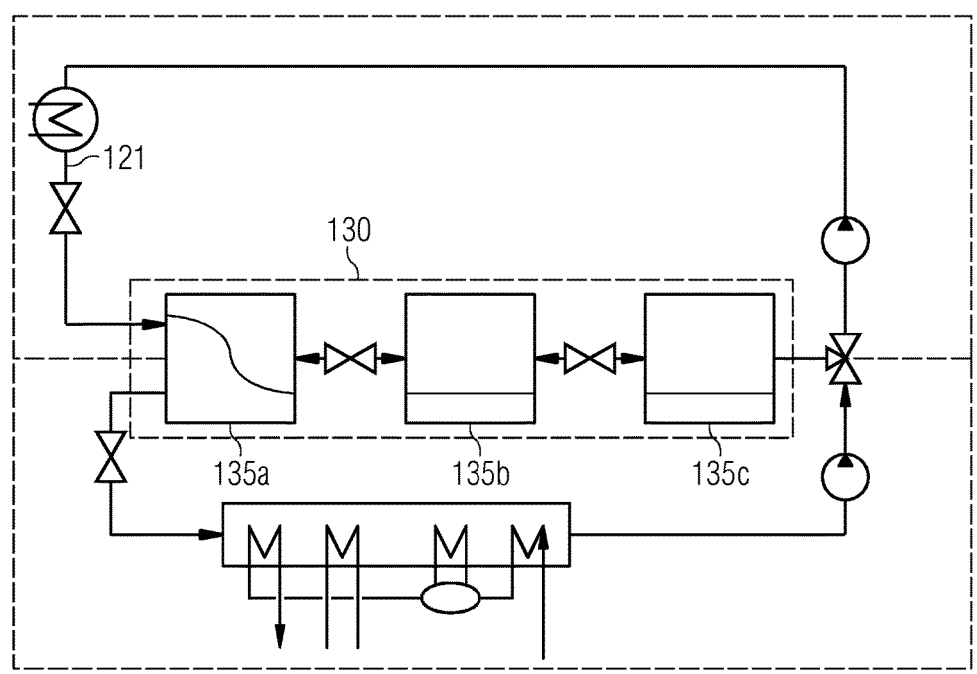
FIG. 5 shows a version of FIG. 2, in a third operative condition, in accordance with embodiments of the present invention.
Figure 6:
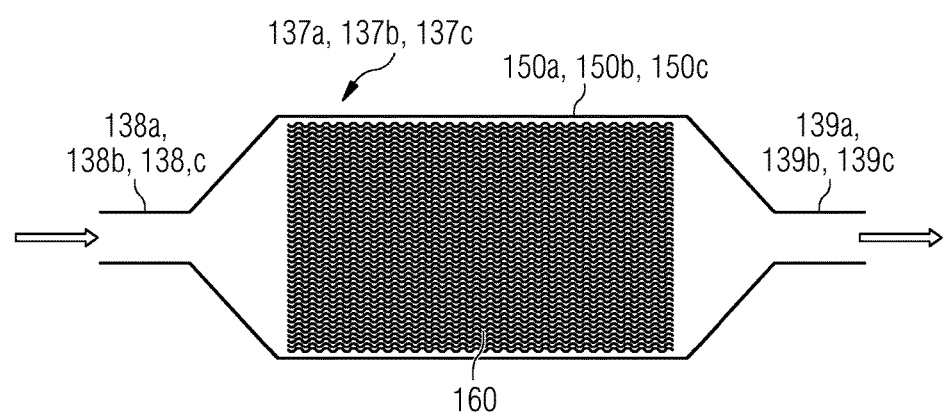
FIG. 6 shows a schematic section view of a component of the thermal energy storage plant of FIG. 1, in accordance with embodiments of the present invention.

According to embodiments of the present invention, a method for operating the thermal energy storage plant 10, during discharging of the heat accumulator 130, comprises the steps of:

opening the valves 137*a*, 137*b*, generating a flow of the second working fluid in the discharging circuit 200, from the cold end 132 to the hot end 131, for transferring heat from the storing elements 160 of the heat storage units 135*a*, 135*b*, 135*c* to the second working fluid, stopping the second fluid transporting machine 210 and the flow of the second working fluid after an inlet 138*a* of the first heat storage unit 135*a* has reached a temperature lower than the first temperature T1 (FIG. 5).

In the heat exchanger 227, the heat received from the storing elements 160 is then transferred from the second working fluid to the thermal cycle 220.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A thermal energy storage plant comprising:
    a charging circuit where a first working fluid is circulated, the charging circuit including:
        a first fluid transporting machine for generating a flow of the first working fluid in the charging circuit,
        a heating device for transferring heat to the first working fluid, and
        a heat accumulator for storing a thermal energy of the first working fluid, the heat accumulator including a hot end for receiving the first working fluid at a first temperature and a cold end for letting the first working fluid exit the heat accumulator at a second temperature lower than the first temperature, wherein the heat accumulator is oriented in such a way that the first working fluid is circulated through heat storage elements within the heat storage units from the hot end to the cold end along a horizontal direction;
    wherein the heat accumulator comprises:
        a plurality of heat storage units connected in series between the hot end and the cold end; and
        at least one valve interposed between two heat storage units of the plurality of heat storage units, wherein a closing of the at least one valve disconnects the plurality of heat storage units from each other during idling operations between charging and discharging phases to prevent a mass flow between the plurality of heat storage units initiated by natural convection.

2. The thermal energy storage plant according to claim 1, further comprising a discharging circuit, the discharging circuit including:
    the heat accumulator,
    a second fluid transporting machine for generating a flow of a second working fluid in the discharging circuit, the flow being oriented from the cold end to the hot end of the heat accumulator,
    a heat exchanger included in a thermal cycle for transferring a thermal energy from the second working fluid to a working fluid of the thermal cycle.

3. The thermal energy storage plant according to claim 1, wherein at least one of the heat storage units of the plurality of heat storage units comprises a housing for a plurality of heat storing elements having high thermal capacity.

4. The thermal energy storage plant according to claim 2, wherein the thermal cycle is a water-steam cycle including a thermal machine and the heat exchanger is a steam generator for transferring the thermal energy from the second working fluid to a mass of water to generate steam to be fed to the thermal machine.

5. The thermal energy storage plant according to claim 3, wherein the first working fluid and the second working fluid are a same fluid.

6. The thermal energy storage plant according to claim 1, wherein the heating device is powered from a renewable energy source.

7. A method for operating the thermal energy storage plant according to claim 1, the method comprising the steps of:
    heating the first working fluid in the heating device;
    generating a flow of the first working fluid in the charging circuit with the first fluid transporting machine, for charging the plurality of heat storage units in series from the hot end to the cold end; and
    stopping the heating and the flow of the first working fluid after at least one heat storage unit has been charged.

8. The method according to claim 7, further comprising the step of isolating the charged heat storage unit from the other heat storage units by means of at least one valve.

9. The method according to claim 8, wherein all heat storage units are isolated from each other, by means of at least one valve provided between the plurality of heat storage units.

10. A method for operating the thermal energy storage plant according to claim 8, the method comprising the steps of:
    opening the at least one valve; generating a flow of the second working fluid in the discharging circuit, from the cold end to the hot end, for transferring heat from the plurality of heat storage units to the second working fluid; and
    stopping the heating and the flow of the second working fluid after an inlet of a heat storage unit which is closest to the hot end has reached a temperature lower than the first temperature.

* * * * *